United States Patent

O'Neil et al.

[11] Patent Number: 5,887,253
[45] Date of Patent: Mar. 23, 1999

[54] METHOD FOR ACTIVATING AND SERVICING A CELLULAR TELEPHONE

[75] Inventors: Douglas Rutherford O'Neil, Marietta; Kenneth Bray Asher, Conyers, both of Ga.

[73] Assignee: BellSouth Corporation, Atlanta, Ga.

[21] Appl. No.: 620,373

[22] Filed: Mar. 22, 1996

[51] Int. Cl.[6] .................................................. H04Q 7/32
[52] U.S. Cl. ........................... 455/418; 455/410; 455/414
[58] Field of Search .................................... 455/418, 410, 455/411, 112, 414, 419

[56] References Cited

U.S. PATENT DOCUMENTS

| | | |
|---|---|---|
| 5,159,625 | 10/1992 | Zicker . |
| 5,485,505 | 1/1996 | Norman et al. . |
| 5,506,887 | 4/1996 | Emery et al. . |
| 5,572,571 | 11/1996 | Shirai . |
| 5,633,914 | 5/1997 | Rosa . |

*Primary Examiner*—Dwayne D. Bost
*Assistant Examiner*—Linwood C. Scott, Jr.
*Attorney, Agent, or Firm*—Jones & Askew

[57] ABSTRACT

This invention is a method of identifying and validating a cellular telephone for activation and for subsequent servicing after activation. A cellular service provider (CSP) (401) specifies an International Mobile Subscriber Identity (IMSI) number for a Subscriber Identity Module (SIM), generates a Mobile Station Integrated Services Digital Network (MSISDN) telephone number, associates the MSISDN with the IMSI in a table, and orders a SIM from a SIM manufacturer (403). The SIM manufacturer manufacturers the SIM, programs the IMSI into the SIM, places a SIM serial number on the SIM, sends the CSP information associating the SIM serial number with the IMSI, and sends the SIM to a Distribution Center (405). A hardware vendor (407) sends a handset and an International Mobile Equipment Identity (IMEI) number for the handset to the Distribution Center. The Distribution Center assembles the SIM and the handset to form a cellular telephone, generates a product package number for the cellular telephone, sends the cellular telephone to a destination (411), and sends information concerning the SIM serial number, IMEI, and product package number to the CSP. The CSP updates the table to associate the IMSI, IMEI, SIM serial number, product package number, and MSISDN. The CSP thus has complete information concerning the cellular telephone, can verify the identity of the cellular telephone for validation before the owner is allowed unrestricted use of the cellular telephone, and can automatically route a call to the appropriate service assistance or message when the user has a question.

23 Claims, 8 Drawing Sheets

METHOD FOR ACTIVATING AND SERVICING A CELLULAR TELEPHONE

TECHNICAL FIELD

This invention relates to cellular telephones and, more particularly, is for a method of activating a cellular telephone by automatically identifying the cellular telephone for assignment of a telephone number to said cellular telephone and so that an agent may assist a customer with programming said cellular telephone.

BACKGROUND OF THE INVENTION

Cellular telephones are typically manufactured and shipped in a non-activated condition. When the cellular telephone is purchased by a customer, the customer must arrange for a telephone number to be assigned to the cellular telephone and for programming and activation of the cellular telephone.

In one example of a typical prior art situation, the customer purchases the cellular telephone from a retailer. The retailer collects specified information, such as a name, an address, a home telephone number, an office telephone number, a social security or other government identification number, a credit card number, etc. The retailer then sends this information to a customer activation center (CAC). The CAC performs a credit check on the customer, assigns a cellular telephone number to the customer, and informs the retailer of the cellular telephone number. The retailer then programs the cellular telephone number into the cellular telephone and advises the customer of the new cellular telephone number. However, the retailer typically receives a fee for programming the cellular telephone number into the cellular telephone. This increases the cost to the customer or decreases the revenue to the cellular telephone carrier company. In addition, the customer must wait until this has been done before the customer can use the cellular telephone. Therefore, one problem to be addressed by the present invention is removing the need for the retailer to program the cellular telephone.

In another example of a typical prior art situation, the customer orders the cellular telephone, such as directly from the telephone company or from a mail order service. When the cellular telephone arrives the customer must arrange to obtain a cellular telephone number for the cellular telephone and to program the cellular telephone number into the cellular telephone. As in the first example, a service organization which performs or arranges for a cellular telephone number or which does the programming typically receives a fee for programming the cellular telephone number into the cellular telephone. This increases the cost to the customer or decreases the revenue to the cellular telephone carrier company. Therefore, another problem to be addressed by the present invention is removing the need for an intermediate business or organization to obtain a cellular telephone number or to program the cellular telephone.

In still another example of a typical prior art situation, as discussed in U.S. Pat. No. 5,485,505, the customer purchases a cellular telephone from any desired location and then directly calls the CAC, either using the cellular telephone or another telephone. The cellular telephone has a dummy Mobile Identification Number (MIN) which allows the cellular telephone to access the cellular telephone network. This feature eliminates the need for the services of an intermediate business or organization because the customer communicates directly with the CAC. The CAC performs the credit check and assigns the cellular telephone number to the cellular telephone. The customer then manually programs the cellular telephone number into the cellular telephone, either by using the instruction manual or by listening to instructions from the CAC. Alternatively, the cellular telephone programming may allow the CAC to remotely program the cellular telephone number into the cellular telephone. This prior art method eliminates the need for the retailer or a service provider to program the cellular telephone. However, some customers encounter difficulty in performing the programming because of unfamiliarity with the concept of programming or because of inadequate instructions in the instruction manual. In addition, in order for the CAC to assist the customer in programming the cellular telephone the customer must be able to tell the CAC the make and, in some instances, the model of the cellular telephone. The make may be obvious if the cellular telephone was sold under the label of the manufacturer, but may not be obvious if the cellular telephone was sold under a private label. The model number, and any revision number, may not be listed or may be difficult to determine without opening the case of the cellular telephone, which may void the warranty. Therefore, another problem addressed by the present invention is enabling the customer activation center to remotely program the cellular telephone and to assist the customer in programming the cellular telephone without the customer knowing the make or model of the cellular telephone.

Another problem is that the customer may lose the instruction manual for the cellular telephone. Then, when the customer wants to use some special feature, such as storing a number for memory dialing (speed dialing), the customer does not know how to access the feature. It is possible that the customer may be able to find someone in the cellular service provider office who knows how to access the feature if the customer knows the make and model. However, as indicated above, the make and model may be difficult for the customer to determine. Therefore, another problem addressed by the present invention is the ability to provide the customer with assistance concerning the operation of the cellular telephone even if the customer has lost the instruction manual and does not know the make or model of the cellular telephone.

SUMMARY OF THE INVENTION

The present invention provides a method whereby information concerning a particular cellular telephone may be conveniently tracked from manufacture to activation, and further if necessary. This information includes, for example, the International Mobile Subscriber Identity (IMSI), and the International Mobile Equipment Identity (IMEI). The cellular telephone comprises a Subscriber Identity Module (SIM), a handset and, in some cases, a cordless home base station. A unique IMSI is assigned to each SIM, and a SIM is programmed with an IMSI before the various components are assembled to form a cellular telephone. The customer is provided a toll free telephone number, such as an 800 telephone number, to call to contact the Customer Activation Center (CAC) of the cellular service provider (CSP) in order to activate the cellular telephone. The customer may call the specified toll free telephone number using any telephone but preferably places the call using the cellular telephone. The customer may place the call by dialing the specified toll free telephone number, by dialing any number, or by just pressing the "Send" button without dialing any number.

If the customer uses the cellular telephone to place the call the cellular telephone sends the IMSI to the MSC. The MSC uses the IMSI to look up the MSISDN (which may be a temporary MSISDN or a permanent MSISDN) in the HLR and any call routing limitations or instructions in a call routing table. Then, regardless of the number dialed by the customer, the MSC routes the call in accordance with the call routing table. In this case, the MSC will route the call to the specified toll free number, and sends the MSISDN as the calling line identification number for the call. The calling line identification number is used by the GPC at the CAC to access a database(a product package table), identify a record (the product package record) specific to that cellular telephone, and ascertain other information concerning the cellular telephone, such as the manufacturer, the model, etc. The CAC then has complete information concerning the cellular telephone. Then, after the customer has been approved for cellular service, the CAC assigns a telephone number to the cellular telephone, updates the Home Location Register (HLR) for that IMSI in the Mobile Services Switching Center (MSC) by sending the newly assigned MSISDN to the HLR, and updates the call routing table.

The present invention provides a method for activating a cellular telephone. The method includes the steps of generating a memory identification number, causing the memory identification number to be stored in a memory device for use with the cellular telephone, generating a temporary telephone number, generating a table which associates the memory number with the temporary telephone number, sending the memory number and the temporary telephone number to a switching center, receiving a call on a predetermined telephone number from the cellular telephone via the switching center, receiving the memory identification number from the switching center, generating a permanent telephone number, replacing the temporary telephone number in the table with the permanent telephone number, and sending the memory number and the permanent telephone number to the switching center. The step of generating the memory identification number comprises generating an International Mobile Subscriber Identity number. The step of generating the temporary telephone number comprises generating a temporary Mobile Station Integrated Services Digital Network telephone number. The step of generating the permanent telephone number comprises generating a permanent Mobile Station Integrated Services Digital Network telephone number. The step of generating a table further includes determining a class of service for the cellular telephone and selecting the predetermined telephone number based upon the class of service, and the step of sending the memory number and the temporary telephone number further includes sending the predetermined telephone number to the switching center.

In another version of the present invention, the method includes the steps of generating a memory identification number, causing the memory identification number to be stored in a memory device for use with the cellular telephone, generating a temporary telephone number, generating a table which associates the memory number with the temporary telephone number, sending the table to a cellular telephone switching center, receiving a call from the cellular telephone via the cellular telephone switching center, receiving the temporary telephone number for the cellular telephone from the cellular telephone switching center, using the temporary telephone number and the table to validate the cellular telephone, generating a permanent telephone number, replacing the temporary telephone number in the table with the permanent telephone number, and sending the permanent telephone number to the cellular telephone switching center. The step of generating the memory identification number comprises generating an International Mobile Subscriber Identity number. The step of generating the temporary telephone number comprises generating a temporary Mobile Station Integrated Services Digital Network telephone number. The step of generating the permanent telephone number comprises generating a permanent Mobile Station Integrated Services Digital Network telephone number.

In another version of the present invention, the method includes the steps of generating a memory identification number for storage in a memory, receiving a table which associates the memory identification number with a Subscriber Identity Module (SIM) serial number placed on the memory, generating a temporary telephone number, modifying the table to associate the memory identification number and the SIM serial number with the temporary telephone number, sending the memory identification number and the temporary telephone number to a cellular telephone switching center, receiving a call from the cellular telephone via the cellular telephone switching center, receiving the temporary telephone number for the cellular telephone from the cellular telephone switching center, using the temporary telephone number and the table to validate the cellular telephone, generating a permanent telephone number, replacing the temporary telephone number in the table with the permanent telephone number, and sending the permanent telephone number to the cellular telephone switching center. The step of generating the memory identification number comprises generating an International Mobile Subscriber Identity number. The step of generating the temporary telephone number comprises generating a temporary Mobile Station Integrated Services Digital Network telephone number. The step of generating the permanent telephone number comprises generating a permanent Mobile Station Integrated Services Digital Network telephone number.

The present invention also provides a method of automatically routing a call from a cellular telephone so that the user can obtain information concerning that type of cellular telephone. The method includes the steps of generating a memory identification number for storage in a memory for use with a cellular telephone, receiving a table which associates the memory identification number with a Subscriber Identity Module (SIM) serial number placed on the memory, receiving a table which associates the SIM serial number, a handset identification number, and a product package identification number for the cellular telephone, generating a telephone number for the cellular telephone, creating a table which associates the memory identification number, the SIM serial number, the handset identification number, and the product package identification number with the telephone number, receiving a call from the cellular telephone via a cellular telephone switching center, receiving the telephone number for the cellular telephone from the cellular telephone switching center, using the telephone number and the table to identify a manufacturer type for the cellular telephone, and routing the call from the cellular telephone based upon the manufacturer type. The step of generating the memory identification number comprises generating an International Mobile Subscriber Identity number. The step of generating the telephone number comprises generating a Mobile Station Integrated Services Digital Network telephone number.

Other objects of, features of, and solutions and advantages provided by, the present invention will become apparent upon reading the following description of the preferred embodiment when taken in conjunction with the drawings and the claims.

DETAILED DESCRIPTION OF THE INVENTION

Figure 1A:
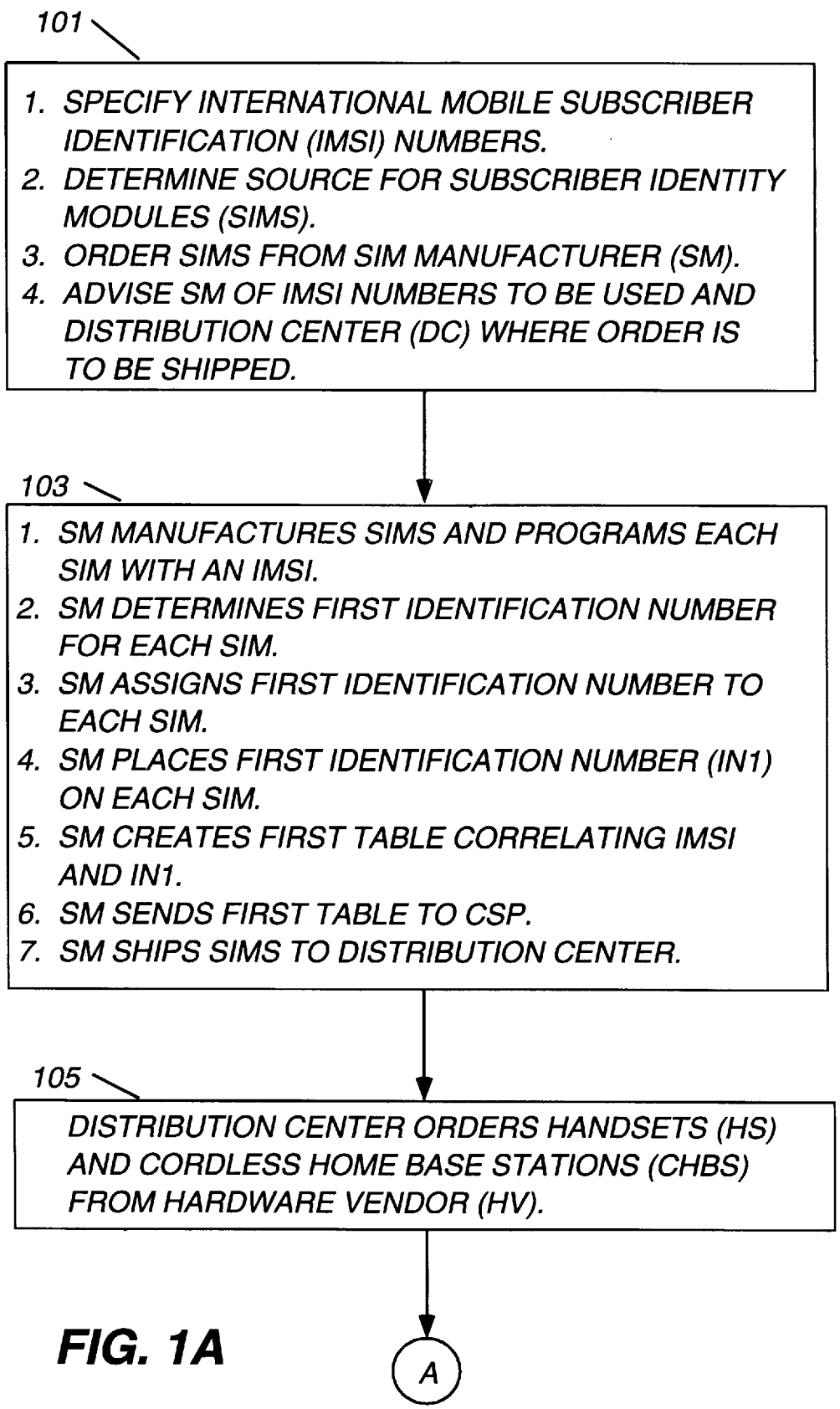
FIGS. 1A and 1B are a flowchart of a method of assigning identification numbers to the various components of the cellular telephone during the assembly process.
Figure 1B:
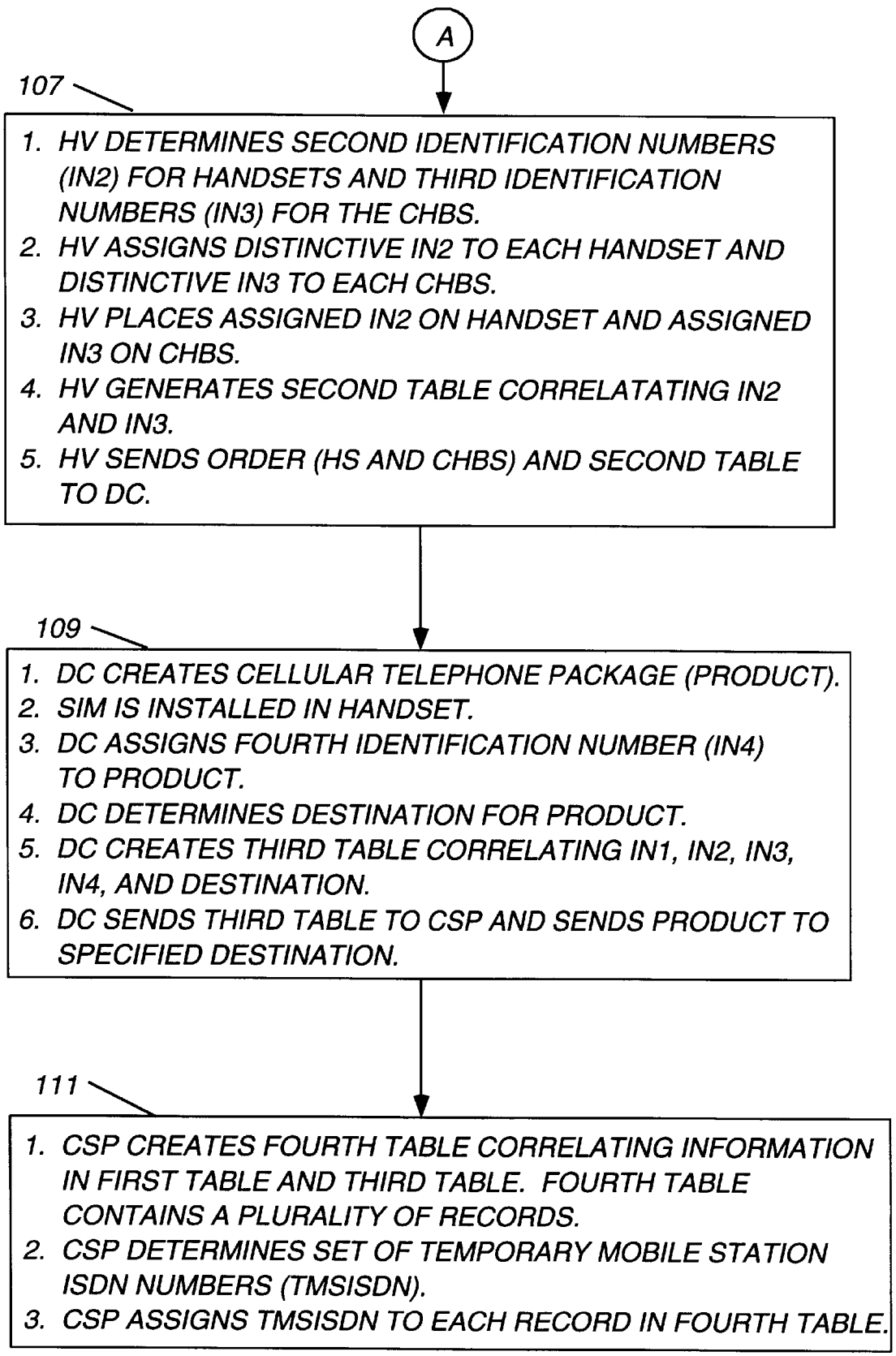
Figure 2A:
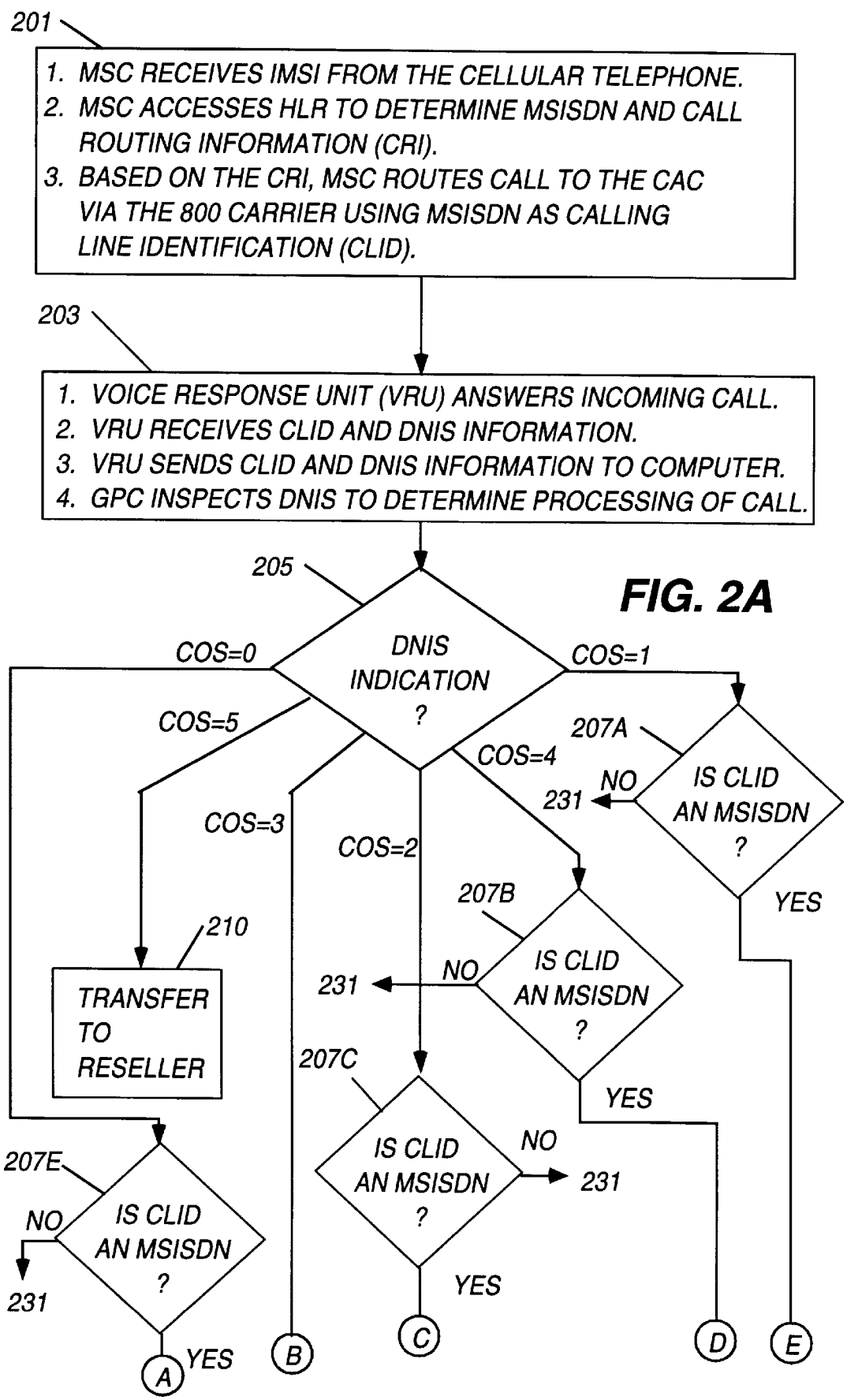
FIGS. 2A–2D illustrate a method for activation of the cellular telephone.
Figure 2B:
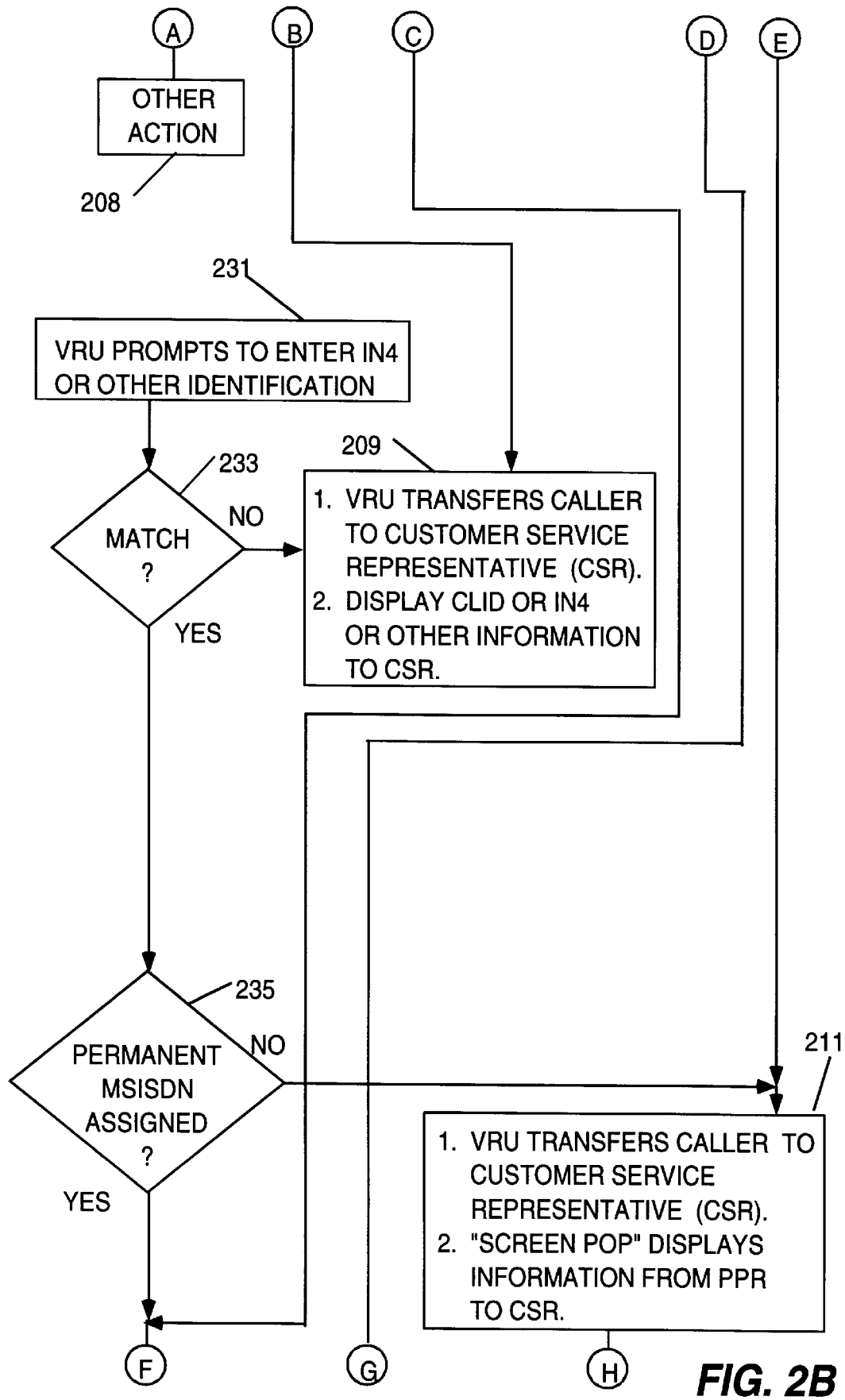
Figure 2C:
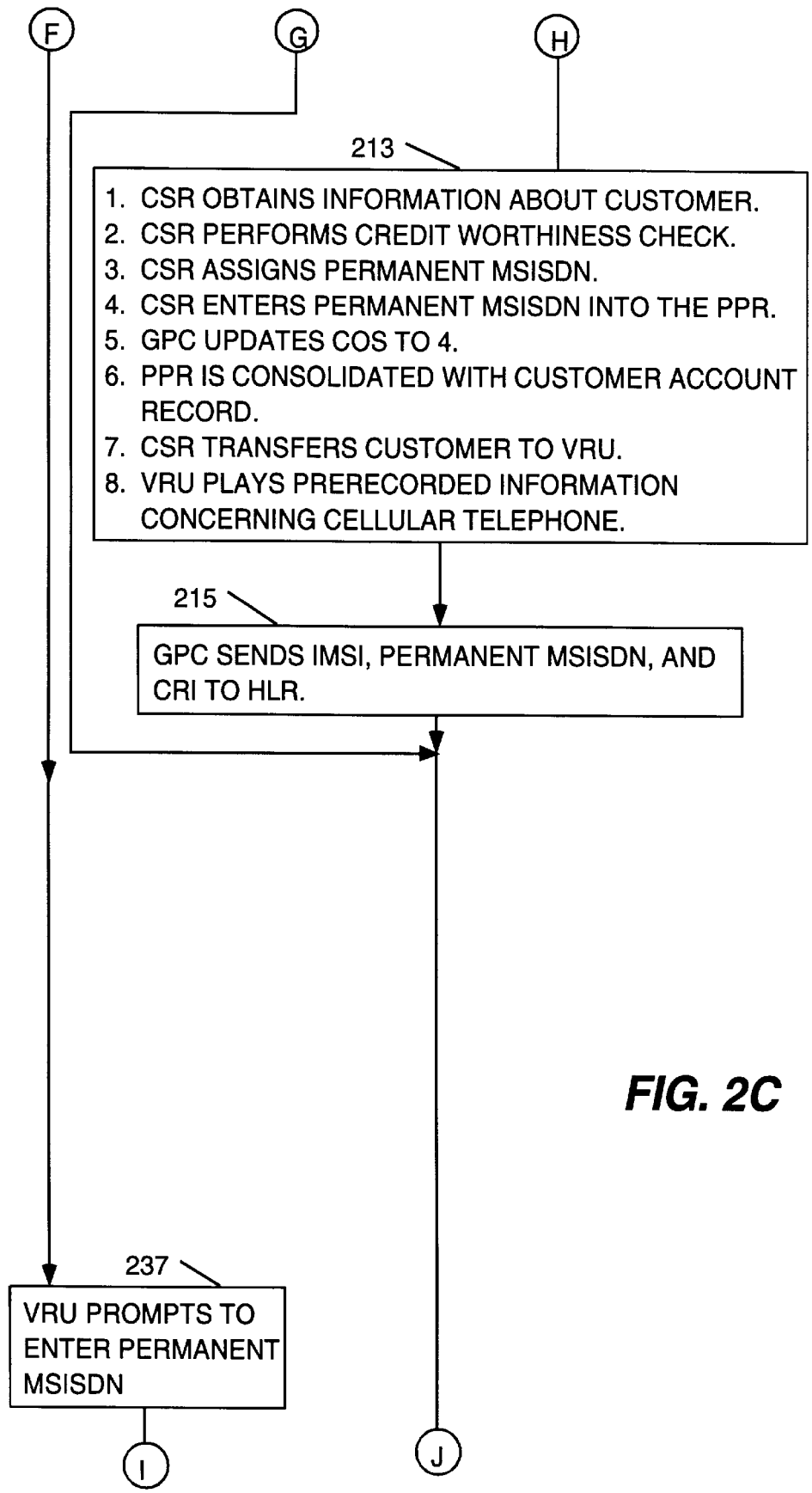
Figure 2D:
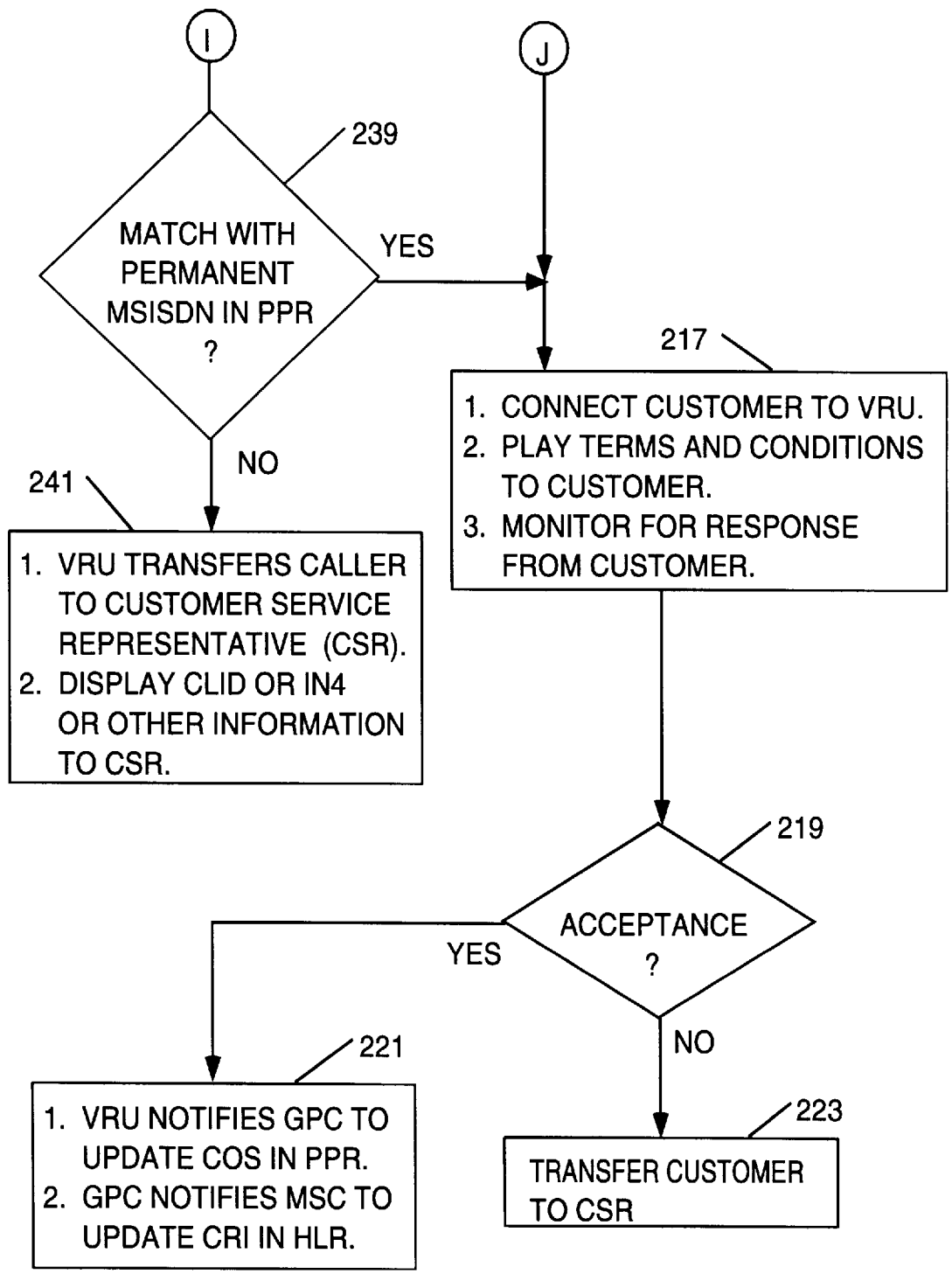

Turn now to the drawings. FIGS. 1A and 1B are a flowchart of a method of assigning identification numbers to the various components of the cellular telephone during the assembly process. Different methods are used to assign identification numbers to the various components of the cellular telephone during the assembly process. The method used will vary depending upon the procedure used for the assembly and sale of the cellular telephone. There are several different scenarios, for example: (1) mass market retail; (2) sale by the cellular service provider where the cellular telephone is shipped to the customer; (3) sale by the cellular service provider where the customer picks up the cellular telephone at the point of sale; and (4) sale to a customer of only a SIM where the customer already owns a SIM-compatible cellular telephone.

In step 101 the cellular service provider (CSP) specifies a set of International Mobile Subscriber Identification (IMSI) numbers, such as a range of IMSI numbers. The CSP also determines a source for a corresponding set of Subscriber Identity Modules (SIMs). The CSP then orders a set of SIMs from the SIM manufacturer (SM), and advises the SM of the set of IMSI numbers which are to be used and the distribution center (DC) where the order is to be shipped. This process may be initiated in response to a business transaction, such as an order by the DC for a shipment of cellular telephones. The CSP stores the IMSI in a computer, such as a general purpose computer (GPC).

In step 103 the SM manufactures the SIMs and programs the SIMs, with each SIM receiving a distinctive IMSI from the set of IMSI provided by the CSP. The SM also determines a set of first identification numbers for the SIMs and assigns a distinctive one of said first identification numbers to each of the SIMs. The SM then places the assigned first identification number (IN1) on the exterior or case of the SIM, such as by a bar code. The SM creates a first table which correlates the IMSI to the IN1 and sends this table, preferably in a machine-readable format, to the CSP. The SM also ships the SIMs to the DC.

In step 105 the DC orders the appropriate number of handsets (HS) and cordless home base stations (CHBS), if required, from a hardware vendor (HV). Step 105 may be started at the same time as, or after step 101 or step 103. The beginning of step 105 will normally be controlled by a date that the DC requires that all of the components of the cellular telephone be available for assembly.

TABLE OF ABBREVIATIONS

| Abbreviation | Meaning |
|---|---|
| ACD | Automatic Call Distributor |
| CAC | Customer Activation Center |
| CHBS | Cordless Home Base Station |
| CLID | Calling Line Identification Number |
| COS | Class Of Service |
| CRI | Call Routing Information |

-continued
TABLE OF ABBREVIATIONS

| Abbreviation | Meaning |
|---|---|
| CSP | Cellular Service Provider |
| CSR | Customer Service Representative |
| CTV | Cellular Telephone Vendor |
| DC | Distribution Center |
| DNIS | Dialed Number Information Service |
| GPC | General Purpose Computer |
| GSM | Global System for Mobile communications |
| HLR | Home Location Register |
| HS | Handset |
| HV | Handset Vendor |
| IMEI | International Mobile Equipment Identity |
| IMSI | International Mobile Subscriber Identity |
| IN1 | Identification Number 1 (On exterior of SIM) |
| IN2 | Identification Number 2 (On handset, preferably the IMEI) |
| IN3 | Identification Number 3 (On CHBS) |
| IN4 | Identification Number 4 (On product package) |
| MSC | Mobile service Switching Center |
| MSISDN | Mobile Station Integrated Services Digital Network |
| PPR | Product Package Record |
| PPT | Product Package Table |
| SIM | Subscriber Identity Module |
| SM | SIM Manufacturer |
| VRU | Voice Response Unit |

In step 107 the HV determines a set of second identification numbers (IN2) for the handsets and a set of third identification numbers (IN3) for the CHBS. The HV then assigns a distinctive IN2 to each handset and a distinctive IN3 to each CHBS. The HV then places the assigned IN2 on a handset and an IN3 on a CHBS. The IN2 is preferably the International Mobile Equipment Identity (IMEI) number. The HV generates a second table which correlates the IN2 and the IN3. The HV then sends the order (HS and CHBS), along with the second table, preferably in a machine-readable format, to the DC.

In step 109 the DC creates a cellular telephone package (product). The product includes a SIM, which is installed into the handset, a handset, a cordless home base station if appropriate, an instruction sheet including a toll free number to call the CSP for activation, instruction manuals, promotional literature, etc. The DC then assigns a fourth identification number (IN4) to the product. The DC also determines the destination for each of the products, such as a retailer, inventory, direct shipment to a customer, etc. Preferably, each distinct destination has a unique destination code, such as a code for a retailer, a code for storage as inventory, a code for direct shipment to customers, etc. The DC also creates a third table which correlates the IN1, IN2, the IN3, the IN4, and the destination. The third table may contain retailer codes for shipments to several different destinations. The DC then sends the third table to the CSP, preferably in a machine-readable format, and sends the products to the specified destinations.

In step 111 the CSP creates a fourth table, a product package table (PPT), which correlates the information in the first table (IMSI and IN1) and the third table (IN1, IN2, IN3, IN4 and destination). The PPT thus contains a plurality of product package records (PPR), wherein each PPR has the following information: IMSI, IN1, IN2, IN3, IN4 and a destination code. The CSP then determines a set of temporary Mobile Station ISDN numbers (temporary MSISDN) and assigns a temporary MSISDN to each PPR in the PPT. The PPT is stored in the GPC.

The CSP assigns a Class Of Service (COS) status for each cellular telephone represented by a record and places the COS status information into the product package record. Thus, each record in the PPT now has the following information: IMSI, IN1, IN2, IN3, IN4, destination code, MSISDN (the temporary MSISDN), and COS status. The COS status is used by the CAC to determine the stage of the activation process for that cellular telephone. The COS status is also a convenient way of indicating which toll free number has been stored in the call routing table of the HLR for that IMSI. The record for a cellular telephone may also have other information if desired. In the preferred embodiment there are six COS status designations: "0" indicates that the cellular telephone has been associated with a customer and has been completely activated; "1" indicates that the cellular telephone has not been associated with a customer but is "pre-activated" and is approved for a telephone call to a specified number or set of numbers, such as a toll free or local telephone number which calls the CSP; "2" indicates that the IMSI is active, that the product has been shipped directly to the customer, that the customer has been assigned a permanent MSISDN, and has been advised of that permanent MSISDN, but that the customer has not yet called in to confirm that the proper person has received the cellular telephone or to acknowledge acceptance of the terms and conditions of cellular service; "3" indicates that the IMSI is inactive or off, which may arise because the IMSI is not currently being used or because a SIM or cellular telephone has been reported as lost or stolen; "4" indicates that the IMSI is active, that the product package has been associated with a customer, that the customer is in possession of the product, that the customer has been assigned a permanent MSISDN, and has been advised of that permanent MSISDN, but the customer has not yet acknowledged acceptance of the terms and conditions of cellular service, so the cellular telephone is "preactivated" and is approved for a telephone call to a specified number or set of numbers, such as the toll free number or a local number which calls the CSP, and that the only thing remaining to complete the activation process is for the customer to acknowledge the terms and conditions of cellular service; and "5" indicates that the IMSI is active, that the customer is the customer of a reseller, that the customer needs to acknowledge the particular terms and conditions of the reseller for the services purchased, that the cellular telephone is pre-activated and approved for telephone calls to a specified telephone which is associated with that particular reseller so that the customer can acknowledge those particular terms and conditions.

The table below shows the components of the preferred components of a PPR.

| COMPONENTS OF A PPR IN A PRODUCT PACKAGE TABLE | | | | | | | |
|---|---|---|---|---|---|---|---|
| IMSI | IN1 | IN2 | IN3 | IN4 | Destination | TEMP. MSISDN PERM. MSISDN | COS Status |

The CSP then sends the temporary MSISDN and the IMSI of the PPT to the Home Location Register (HLR) of the Mobile service Switching Center (MSC). The CSP also sends information to the HLR regarding the COS status. Specifically, the CSP updates a call routing table in the HLR which specifies how calls to or from that IMSI are to be handled; that is, whether the calls from this IMSI are processed as dialed or are routed to some predetermined telephone number, such as the VRU of the CAC. At this point, the SIM is pre-activated in the Global System for Mobile communications (GSM) telephone network but has not yet been associated with a customer. The call routing table below shows the disposition of calls based upon the COS status. For example, if the COS status is 1, then the call routing table is updated to show that all calls from that IMSI are to be redirected to the first toll free telephone number.

| CALL ROUTING TABLE | |
|---|---|
| COS Status | Call Disposition |
| 0 | Process call as dialed |
| 1 | Redirect call to first specified toll free (800) number |
| 2 | Redirect call to second specified toll free number |
| 3 | Redirect call to third specified toll free number |
| 4 | Redirect call to fourth specified toll free number |
| 5 | Redirect call to fifth specified toll free number |

At this point the complete product package has been assembled, and shipped to the retailer for eventual sale to the customer, shipped directly to the customer, or held in inventory. Also, the CSP has complete information concerning the package, and the HLR has the information necessary to allow a call from the cellular telephone to be routed to the CAC for activation.

As previously stated, the cellular telephone product or package may reach the customer by any of several different procedures. For example, the customer may purchase the product from a retailer and go home with the product in hand. Also, the customer may purchase the cellular telephone and/or services directly from the CSP, either by picking up the cellular telephone or by having the cellular telephone shipped to him/her, or the customer may purchase the cellular telephone from an organization which has a business relationship with the CSP.

Purchase From Retailer

In the scenario where the customer purchases the cellular telephone from the retailer, the customer may call the CSP by dialing any number using the cellular telephone or by dialing the specified toll free number using another telephone. The cellular telephone has already been pre-activated for calls to the CSP (COS status is 1) so that the call is automatically routed to the CSP. The CSR will then obtain information about the customer, determine what product and what services the customer wishes to purchase, verify the credit worthiness of the customer, assign a permanent MSISDN to the customer, enter into the GPC the MSISDN assigned to the customer, and set the COS status to 4 for that IN1 or IMSI. The GPC then updates the PPR with the permanent MSISDN and updates the HLR with the permanent MSISDN for that IMSI, and updates the call routing restrictions for that IMSI in the call routing table. Then, when the customer calls again, or is transferred by the CSR, the customer will be routed to the VRU to acknowledge the terms and conditions of the service.

Ordering From The CSP

In the scenario where the customer orders the cellular telephone directly from the CSP, the CSR will obtain information about the customer, determine what product and what services the customer wishes to purchase, and verify the credit worthiness of the customer. The CSR will then input the information into the GPC. The GPC will then check product inventory records and advise the CSR whether the requested product is available so that the CSR can immediately discuss another product or a delayed shipment date if the requested product is not available. If the requested product is available or a shipment date is accepted, then the CSR will assign a permanent MSISDN to the customer.

The CSP will then create a record for the customer. This record will be combined with a PPR once the requested product has been specifically identified in inventory and associated with the customer. The CSP then sends an order for the requested product, including a shipping address, to the DC. For security reasons, the CSP preferably does not send the permanent MSISDN to the DC.

The DC pulls the requested product from inventory and notes the IN4. Using the IN4, the DC retrieves from memory the previously recorded IN1 (the SIM identification number), IN2, and IN3 associated with that IN4. The DC then sends this information, preferably in machine readable format, to the CSP. The DC then ships the product to the customer.

The CSP combines the customer record information with the information from the DC, and appends the permanent MSISDN to the record without replacing the temporary MSISDN. The CSP then assigns a COS status of 2 to the temporary IMSI. The CSP updates the HLR by assigning the permanent MSISDN to the IMSI, and updates the routing table in the HLR for that IMSI so that the MSC routes all calls from that cellular telephone to the VRU at the second predetermined toll free telephone number.

When the customer receives the product, the customer may, as described herein, call the CSP by dialing any number using the cellular telephone or by dialing the specified toll free number using another telephone.

Purchasing Direct From The CSP

In the scenario where the customer purchases the cellular telephone directly from a store operated by the CSP, or the customer purchases the cellular telephone from an organization which has a direct business relationship with the CSP, the CSR will obtain information about the customer, determine what product and what services the customer wishes to purchase, verify the credit worthiness of the customer, assign a permanent MSISDN to the customer, and ask the customer to acknowledge and accept the terms and conditions of the cellular service. The CSR will then input the information into the GPC. The CSR then enters into the GPC, either manually or by scanning, the SIM serial number (IN1) or the product package number (IN4). The CSR then enters into the GPC the MSISDN assigned to the customer and sets the COS status to 0 for that IN1 or IMSI. The GPC then updates the PPR with the permanent MSISDN and updates the HLR with the permanent MSISDN for that IMSI, and by removing call routing restrictions for that IMSI from the call routing table. The customer has now been approved and the activation process is complete so the customer can leave the store with a fully activated cellular telephone.

Ordering A New SIM

In another example, the customer will already own a SIM-compatible telephone and the customer will only want to purchase a new SIM. The customer will call the CSP, or an authorized agent thereof, and request cellular telephone services, which will include another SIM for installation in the existing customer-owned cellular telephone. The CSR will verify that the customer already owns a SIM-compatible telephone, will obtain the necessary information about the customer, including any currently assigned cellular telephone number of the customer, and will verify the credit worthiness of the customer. The CSR will assign a permanent MSISDN to the customer, sell any desired services to the customer, and determine a shipping date for the SIM. The CSR then enters the information into the GPC. The GPC checks the inventory to determine availability of a SIM and immediately notifies the CSR if a SIM is not available.

If the SIM is in the inventory of the DC then the GPC sends an order to the DC for a SIM to be shipped to the customer. Preferably, the DC is not advised of the MSISDN. When the DC ships the product to the customer the DC will notify the CSP of the purchase order number and the identification number (IN1) marked on the SIM. The CSP will update the PPR for the SIM with that IN1, by adding the permanent MSISDN and other information, such as the customer's name, address, etc., which is in the customer record. The CSP then updates the COS status to 2, and the GPC updates the HLR by assigning the permanent MSISDN for that IMSI. The CSP also updates the HLR routing table for that IMSI so that all calls from that IMSI are routed into the VRU at the second predetermined toll free number so that the CSP can verify that the correct person has received the SIM. The SIM is preferably shipped with instructions so that the customer, upon receiving the SIM, is advised how to insert the SIM and what number to call to complete the activation process.

Ordering A Replacement SIM

In another case, the customer will already own a SIM-compatible telephone, and will already have an established account with the CSP, and will already have a permanent MSISDN, so the customer will only want to purchase a replacement SIM. The customer will call the CSP, or an authorized agent thereof, for a replacement SIM for installation in the existing customer-owned cellular telephone. The CSR will verify that the customer already owns a SIM-compatible telephone, and will obtain the information about the customer necessary to verify the identity of the customer. The CSR then determines a shipping date for the SIM. The CSR then enters the information into the GPC. The GPC checks the inventory to determine availability of a SIM and immediately notifies the CSR if a SIM is not available.

If in inventory of the DC then the GPC sends an order to the DC for a SIM to be shipped to the customer. Preferably, the DC is not advised of the MSISDN. As the customer is an established customer, there will a PPR for the customer and the cellular telephone. The order number is stored in the PPR. When the DC ships the product to the customer the DC will notify the CSP of the order number, and any identification numbers (IN1) marked on the SIM or on the product package. The CSP will input this information into the PPR, thereby updating the PPR to contain the new IMSI and the new SIM serial number. The CSR then updates the COS to 2, and the GPC sends the new IMSI, the permanent MSISDN, and the COS to the HLR in the MSC. The GPC also notifies the HLR and the inventory database that the old IMSI is out of service and sets a COS of 3 for the old IMSI. The SIM is preferably shipped along with instructions so that the customer, upon receiving the SIM, is advised how to insert the SIM and what number to call to complete the activation process.

Purchasing A Replacement SIM

In another case, the customer will already own a SIM-compatible telephone, and will already have an established account with the CSP, and will already have a permanent MSISDN, so the customer will only want to purchase a replacement SIM. The customer will go to a store managed by the CSP, or an authorized agent thereof, for a replacement SIM for installation in the existing customer-owned cellular telephone. The CSR will verify that the customer already owns a SIM-compatible telephone, and will obtain the information about the customer necessary to verify the identity of the customer. The CSR then enters (manually or by scanning) the SIM serial number (IN1) or product package number (IN4) and the GPC then updates the PPR to reflect the new IMSI. The CSR then sets the COS status to 0 for the new IMSI. The GPC then notifies the MSC to update the HLR with the new IMSI and COS and notifies the MSC to update the HLR and the inventory database to show that the old IMSI is out of service and to set a COS of 3 for the old IMSI. In this situation, the activation process is complete and the customer need not call any number for activation. However, it will be seen that the PPR for that cellular telephone and that customer is updated to show the new IMSI.

Turn now to FIGS. 2A–2D, which illustrate the method for activation of the cellular telephone. Assume that the cellular telephone was shipped to a retailer, that the customer purchased the cellular telephone from the retailer, and that the customer has had no previous contact with the CAC of the CSP.

Assume that the customer uses the cellular telephone to call the toll free number provided with the package or call any number. This toll free number may also be preprogrammed as one of the speed dial buttons on the cellular telephone. In step 201 the MSC receives the IMSI from the cellular telephone. The MSC accesses the HLR to determine the MSISDN and any Call Routing Information (CRI), such as restrictions or limitations, in the call routing table. If the COS status is not "0" then there will be a call routing instruction in the call routing table. In this case, the COS status is 1, which indicates that the cellular telephone is "pre-activated", so the call routing table will cause all telephone calls from that IMSI to be routed to a specified number, such as the toll free number or a local number which calls the CSP. The HLR in the MSC also contains the temporary MSISDN so the MSC uses the IMSI to look up the temporary MSISDN in the HLR. Therefore, regardless of the number dialed by the user, the MSC routes the call to the CAC at the first specified telephone number. The MSC then sends the call to the specified carrier (toll free carrier or local carrier) using the temporary MSISDN as the calling line identification (CLID).

In another scenario, the customer purchases the product from the retailer and goes home with the product in hand. However, rather than using the cellular telephone to place a call, the customer calls the specified toll free number using another telephone, such as the purchaser's home telephone. By calling the toll free number, the customer will be connected to the VRU, as before. However, the VRU will receive the CLID of this other telephone, rather than the MSISDN of the cellular telephone.

In step 203 a Voice Response Unit (VRU) at the CAC answers the incoming call from the toll free carrier or from the local carrier, such as the local telephone office, if a local telephone number was used. The carrier delivers the CLID and the dialed number (the toll free number or the local number) via the Dialed Number Information Service (DNIS). The VRU sends the CLID and the DNIS information to the GPC.

In the preferred embodiment there is a different telephone number for each assigned COS status so, in step 205, the GPC inspects the DNIS to determine how the call should be processed based upon the COS status indicated by the number called. In an alternative embodiment, there is a single telephone number, regardless of the COS status so the GPC uses the CLID, or the MSISDN input by the customer, to inspect the PPR to determine if the CLID or input MSISDN is a valid MSISDN, the COS status and how the call should be processed. Returning to the preferred embodiment, if the COS status is other than 3 or 5, the GPC will then inspect the CLID in step 207A, 207B, 207C, or 207D, as appropriate based upon the COS status from the DNIS. If the CLID is not a valid MSISDN then step 231 will be executed. The MSISDN may be a temporary MSISDN or a permanent MSISDN. If the CLID is a valid MSISDN then step 211 will be executed (COS status is 1), step 237 will be executed (COS status is 2), step 217 will be executed (COS status is 4), or some other action will be taken in step 208 (COS status is 0). If the COS status is 3 (lost or stolen) then step 209 will be executed. If the COS status is 5 then the call will be transferred to the reseller for further processing in step 210.

In step 209, the GPC instructs the VRU to transfer the call to a CSR and also sends the CLID and any information the PPR to the workstation of the CSR. For example, if the COS is 3, then the GPC will send the MSISDN, such as the IMSI, IN1, IN2, an indication that the COS is 3, etc. to the workstation of the CSR. The CSR is thus connected to the calling party and the CSR has on-screen any available information concerning that MSISDN. The CSR then asks questions to determine if there is an error or whether a command should be sent to the cellular telephone to disable the cellular telephone from further communications.

In step 210, the COS is 5, so the IMSI is active so the GPC sends the information from the PPR, such as the IMSI, IN1, IN2, an indication that the COS is 5, etc. to the workstation of an agent of the reseller. The agent of the reseller then asks the questions necessary to complete the process of activating the cellular telephone and changing the COS to 0.

In step 211 the GPC instructs the VRU to transfer the call to the CSR for activation and sends the information from the PPR to the workstation of the CSR.

In step 213, the CSR obtains the necessary information about the customer, performs a credit worthiness check, assigns a permanent MSISDN, enters the permanent MSISDN into the PPR. The GPC then updates the COS status to 4 and the PPR is consolidated with the customer account record so that the consolidated PPR/customer account record now has the complete information regarding the cellular telephone (IMSI, IMEI, MSISDN, etc.) and also the complete information regarding the customer (name, address, home and office telephone numbers, credit card number, references, etc.). Thus, a single record now has all of the information concerning the customer and the cellular telephone. Several options are now available. (1) The CSR may instruct the customer to hang up and call in again. If the customer uses the cellular telephone then, because the COS status has been changed and the routing instructions in the HLR have been changed, the customer will be routed to the correct telephone number regardless of the number that the customer dials. If the customer does not use the cellular telephone then the customer will preferably call in on a different telephone number. (2) The CSR may advise the customer that the customer is going to be transferred to the VRU to hear prerecorded messages and that the customer should hang up and call again, as in (1) above, when the recorded messages are finished. (3) The CSR may advise the customer that the customer is going to be transferred to the VRU to hear prerecorded messages. The VRU then plays, to the customer, prerecorded information concerning the cellular telephone.

In step 215 the GPC sends the IMSI, the permanent MSISDN, and an instruction that the COS is 4 to the HLR.

If option (1) is implemented then the customer will hang up immediately and call in again. If option (2) is implemented then, when the messages concerning the operation of the cellular telephone are finished, the customer will hang up and call in again. If either of these options is implemented then the customer will call in again, steps 201, 203, 205 and 207 will be executed again, and the customer will be connected to the VRU in step 217. If option (3) is implemented then, when the messages concerning the operation of the cellular telephone are finished, the customer will remain connected to the VRU and the GPC will cause step 217 to be executed.

In step 217 the VRU plays to the customer recorded messages concerning the terms and conditions of cellular service, charges and payment, and any other contract provisions which the customer must acknowledge and accept. The VRU then instructs the customer to indicate acceptance of the terms and conditions by pressing a specified key, such as "1", or by speaking a specified word or phrase, such as "yes" or "I accept".

In step 219, the VRU then monitors for a response by the customer and sends the response to the GPC.

If the customer has accepted then, in step 221 the response is recorded and the VRU notifies the GPC to update the PPR to show that the customer status is active, that is, COS=0. The GPC then updates the COS to 0 in the PPR, and also notifies the MSC to update the COS to 0 in the HLR. The GPC notifies the VRU that the transaction and update have been completed without error. The GPC sends the IMSI, the permanent MSISDN, and COS=0 to the MSC. This notifies the MSC to update the HLR to show that the customer is active and to remove the call restrictions on that IMSI. The GPC also sends a notice to the Short Message Service (SMS). The SMS then sends the real (permanent) MSISDN to the cellular telephone handset, via the cellular network. The handset then updates stores the permanent MSISDN in a register that the user can recall if the user happens to forget the MSISDN. The information stored in this register is purely for the convenience of the user and is not used by the cellular telephone. The customer is then fully activated and may use the cellular telephone to make and receive calls in a normal manner.

The GPC then makes an entry that the temporary MSISDN is no longer used and may be reassigned, that the customer acknowledged and accepted the terms and conditions, that the information has been sent to the HLR to activate the customer, and that the specified product package has been received by a customer. The GPC also causes a "Welcome" letter to be generated and sent to the customer, and may also cause a confirmation copy of the accepted terms and conditions to be sent to the customer, and makes an entry that these actions have been taken. This completes the activation process for the cellular telephone.

If, at step 219, the customer has not accepted, or has not responded, then the customer is transferred to the CSR in step 223. The CSR may then inquire as to whether the customer did not understand the message, or did not understand the terms, or intended to reject the contract terms and conditions. In the first two instances, the CSR will repeat the terms and conditions, explain them, or transfer the customer to someone who can, such as a supervisor. At that point, if the customer intends to accept the contract, the CSR will transfer the customer to the VRU at step 217. If the customer still refuses to accept the terms and conditions then the CSR terminates the service. The CSR then instructs the customer to return the telephone to the place of purchase. Any assigned permanent MSISDN will also be deactivated.

If, at step 205, the COS status is 2, then, in step 237, the VRU will prompt the customer to enter the permanent MSISDN. The VRU then sends the MSISDN entered by the customer to the GPC. The GPC then compares the MSISDN entered by the customer with the MSISDN in the PPR for that IMSI. If there is a match then step 217 is executed.

If, at step 237, there is not a match then, in step 241, the customer is transferred to a CSR and the GPC sends the information from the PPR, such as the entered MSISDN, the MSISDN from the PPR, the IMSI, IN1, IN2, an indication that the COS is 2, etc. to the workstation of the CSR. The CSR can then talk to the customer determine if the customer mistakenly entered the wrong number, or did not understand the instructions, or if there is an attempted fraud, or if the cellular telephone was lost or stolen, etc., and then take the appropriate action, such as transferring the customer back to the VRU in step 237 or deactivating the cellular telephone.

If, at step 205, the COS status is 4, then, step 217 will be executed.

If the MSISDN is valid and the COS status is 0 then the cellular telephone and the customer's account are fully active, so the customer must be calling for another reason, such an to obtain information on the operation or features of the cellular telephone. The PPR contains information concerning the make and model of the cellular telephone. Therefore, in step 208, the customer may be transferred to a CSR for personal assistance, or to determine the needs of the customer, or may be transferred to the VRU, whereby the VRU presents a menu of options that the user may select in order to hear the desired information concerning the operation of the cellular telephone. In the case where the customer is transferred to the CSR then the available information on the customer and the telephone appear on the CSR's display screen. Also, information, such as operating instructions, for that particular make and model of cellular telephone appear on the CSR's display screen. Therefore, the CSR has the information necessary to assist the client even if the client does not know the make or model of the cellular telephone. Likewise, if the customer is transferred to the VRU then the menu options allow the customer to hear prerecorded instructional messages concerning the operation of the cellular telephone or specific features of the cellular telephone. The MSISDN or the IMSI allow the GPC to recover the PPR concerning the cellular telephone so that the GPC can transfer the customer to a set of VRU messages specific to the cellular telephone of the customer.

A customer, even though fully activated, may wish to contact the CSP to discontinue service, such as when the customer is moving to an area not serviced by the CSP. At this point, the COS status may be still be 0. When the customer calls the specified toll free or local telephone number the customer will be connected to a CSR, either directly or via interaction with the VRU. The CSR will verify the identity of the customer and attempt to keep the customer enrolled. However, if this fails the CSR will attempt to arrange with the customer for any outstanding bills to be paid. The CSR will then update the PPR to show the account as being inactive and, for example, show the IMSI as inactive, delete the MSISDN, and change the COS status to 3, etc. The GPC will then instruct the MSC to update the HLR by removing the MSISDN, the IMSI, changing the call routing, etc. Thus, the cellular telephone will become unusable.

There is another situation in which the customer may be hotlined to the CSP. For example, the customer may have an overdue or overbalance account. In this case, for example, the CSR will change the COS status to 2, and the GPC will instruct the MSC to update the HLR call routing table accordingly. When the customer attempts to call any number the call routing table will cause the MSC to route the call directly to the CSP, and the VRU will connect the call directly with a CSR. The CSR can then attempt to arrange a satisfactory repayment plan with the customer. If that is unsuccessful the CSR will update the PPR to show the account as being inactive and, for example, show the IMSI as inactive, delete the MSISDN, and change the COS status to 3, etc. The GPC will then instruct the MSC to update the HLR by removing the MSISDN, the IMSI, changing the call routing table, etc. Thus, the cellular telephone will become unusable.

Deactivation as outlined above may also be accomplished, in the same manner, if the customer chooses to come to the place of business of the CSP.

Figure 3:
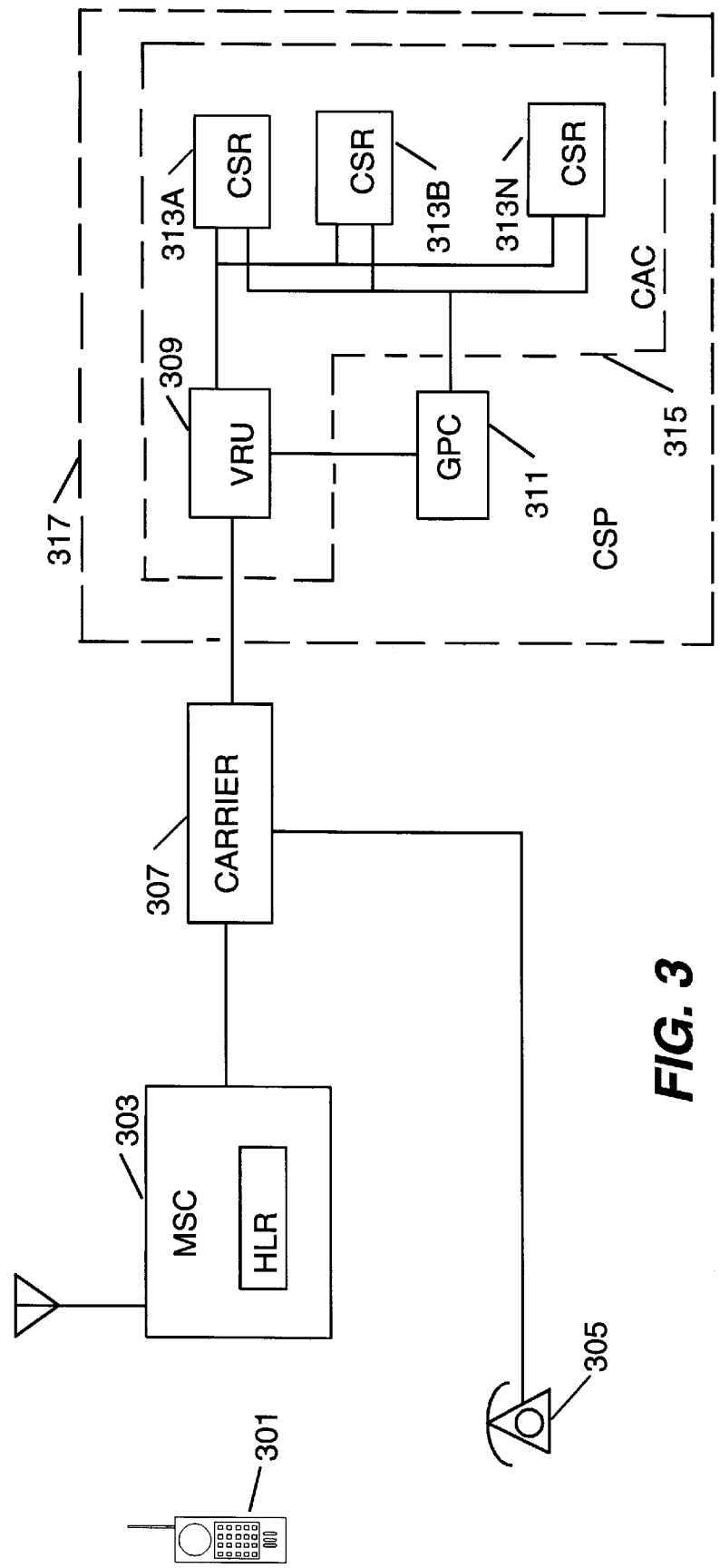
FIG. 3 is a block diagram of the preferred environment of the present invention.

FIG. 3 is a block diagram of the preferred environment of the present invention. The cellular telephone 301 is in communication with the MSC 303. The MSC contains the HLR. The MSC is connected to a carrier 307, such as a toll free carrier. Also, a conventional telephone 305 is connected to the carrier 307 through the public switched telephone network (PSTN) (not shown). The customer may call using either the cellular telephone 301 or the conventional telephone 305. The call is routed by the carrier 307 to the VRU 309. The VRU 309 contains voice recording and playback apparatus, and tone and voice decoding apparatus. The VRU may be connected to, or may be part of, a PBX which can route the incoming call to any one of the CSR workstations 313A–313N. The VRU is also connected to the GPC 311. The VRU 309 can thus send information, such as the MSISDN and the DNIS, to the GPC 311, and the VRU 309 can receive instructions from the GPC 311. The GPC 311 is also connected to the CSR workstations so that the GPC 311 can send information for display to the CSRs, and receive information input by the CSRs. The GPC also has other input and output means, not shown, such as tape and disk drives, printers, modems, etc., so that the GPC can send and receive other information, such as the information input into or read from the PPT. The VRU 309 and the CSR workstations 313A–313N are part of the CAC 315. The CAC 315 and the GPC 311 are part of the CSP.

Figure 4:
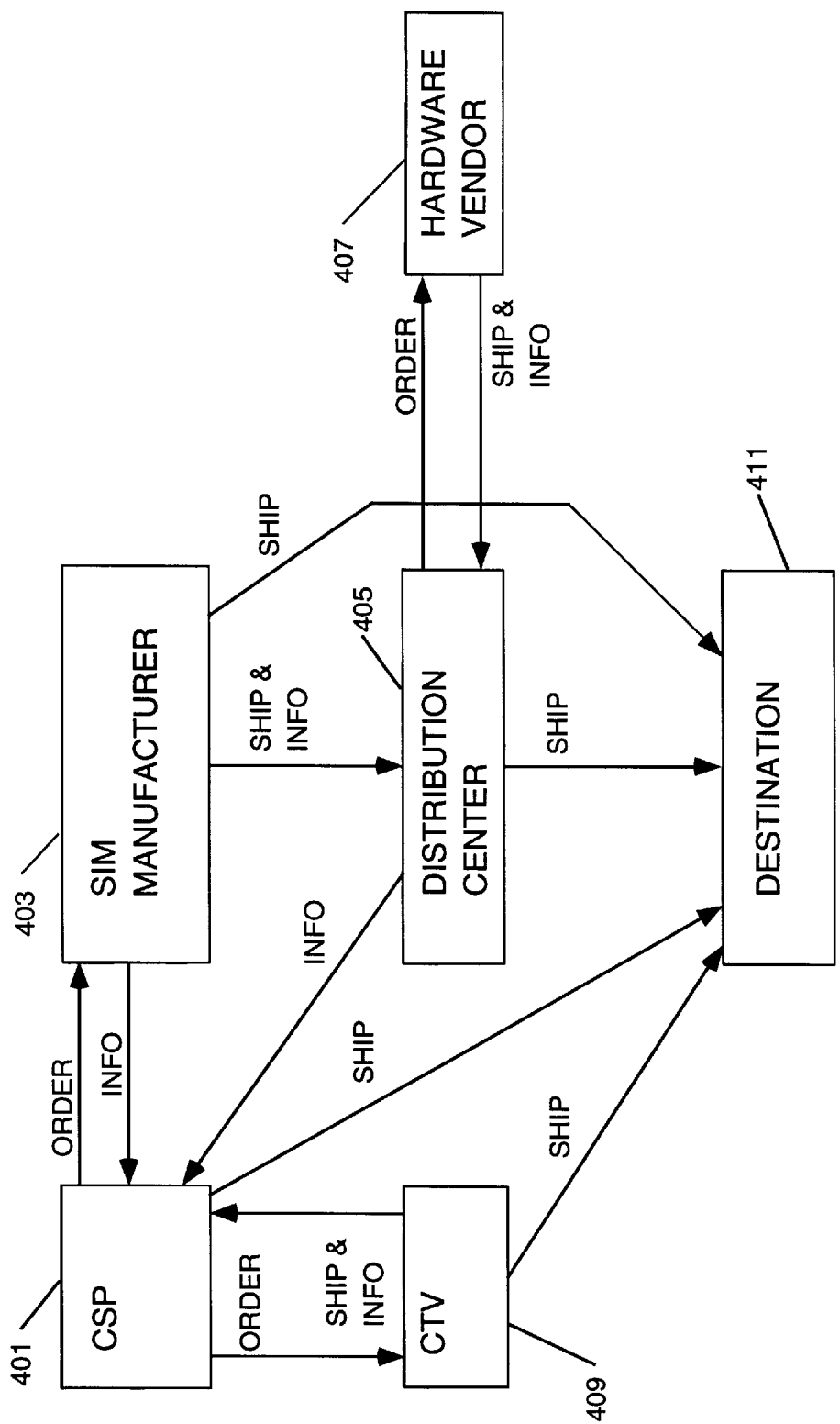
FIG. 4 is a block diagram of the information and product exchange process of the present invention.

FIG. 4 is a block diagram of the information and product exchange process of the present invention, showing the interconnection and cooperation among the CSP 401, the SIM manufacturer (SM) 403, the distribution center (DC) 405, the hardware vendor (HV) 407, the cellular telephone vendor (CTV) 409, and the destination 411. The destination 411 may be an intermediate destination, such as a retail store, or a final destination, such as the customer. The CSP 401 will send a purchase order to the SM 403. The purchase order may contain information such as an IMSI, a purchase order number, etc. The SM 403 then ships the SIM to the DC 405 or the destination 411, and sends the information, such as the SIM serial number, to the CSP 401. The DC 405 places an order for handsets and/or cordless home base stations to the HV 407. The HV then ships the ordered products and the identification numbers to the DC 405. The DC 405 assembles and ships the cellular telephone to the destination 411 and sends the information, such as the identification numbers IN2, IN3, etc., to the CSP 401.

The CSP 401 may also place an order with the CTV 409, which will ship the product to the destination 411 and send the information to the CSP 401, or ship the product and send the information to the CSP 401.

From a reading of the description above of the preferred embodiment of the present invention, modifications and variations thereto may occur to those skilled in the art. Therefore, the scope of the present invention is to be limited only by the claims below.

We claim:

1. A method for activating a cellular telephone, comprising the steps of:

generating a memory identification number;

causing said memory identification number to be stored in a memory device for use with said cellular telephone;

generating a temporary telephone number;

generating a table which associates said memory number with said temporary telephone number;

sending said memory number and said temporary telephone number to a switching center;

receiving a call on a predetermined telephone number from said cellular telephone via said switching center;

receiving said temporary telephone number from said switching center;

generating a permanent telephone number;

replacing said temporary telephone number in said table with said permanent telephone number; and sending said memory number and said permanent telephone number to said switching center.

2. The method of claim 1 wherein said step of generating said memory identification number comprises generating an International Mobile Subscriber Identity number.

3. The method of claim 1 wherein said step of generating said temporary telephone number comprises generating a temporary Mobile Station Integrated Services Digital Network telephone number.

4. The method of claim 1 wherein said step of generating said permanent telephone number comprises generating a permanent Mobile Station Integrated Services Digital Network telephone number.

5. The method of claim 1 wherein said step of generating a table further comprises determining a class of service for said cellular telephone and selecting said predetermined telephone number based upon said class of service, and said step of sending said memory number and said temporary telephone number further comprises sending said predetermined telephone number to said switching center.

6. A method for activating a cellular telephone, comprising the steps of:

generating a memory identification number;

causing said memory identification number to be stored in a memory device for use with said cellular telephone;

generating a temporary telephone number;

generating a table which associates said memory number with said temporary telephone number;

sending said table to a cellular telephone switching center;

receiving a call from said cellular telephone via said cellular telephone switching center;

receiving said temporary telephone number for said cellular telephone from said cellular telephone switching center;

using said temporary telephone number and said table to validate said cellular telephone;

generating a permanent telephone number;

replacing said temporary telephone number in said table with said permanent telephone number; and sending said permanent telephone number to said cellular telephone switching center.

7. The method of claim 6 wherein said step of generating said memory identification number comprises generating an International Mobile Subscriber Identity number.

8. The method of claim 6 wherein said step of generating said temporary telephone number comprises generating a temporary Mobile Station Integrated Services Digital Network telephone number.

9. The method of claim 6 wherein said step of generating said permanent telephone number comprises generating a permanent Mobile Station Integrated Services Digital Network telephone number.

10. The method of claim 6 wherein said step of generating a table further comprises determining a class of service for said cellular telephone and selecting said predetermined telephone number based upon said class of service, and said step of sending said table further comprises sending said predetermined telephone number.

11. A method for activating a cellular telephone, comprising the steps of:

generating a memory identification number for storage in a memory;

receiving a table which associates said memory identification number with a Subscriber Identity Module (SIM) serial number placed on said memory;

generating a temporary telephone number;

modifying said table to associate said memory identification number and said SIM serial number with said temporary telephone number;

sending said memory identification number and said temporary telephone number to a cellular telephone switching center;

receiving a call from said cellular telephone via said cellular telephone switching center;

receiving said temporary telephone number for said cellular telephone from said cellular telephone switching center;

using said temporary telephone number and said table to validate said cellular telephone;

generating a permanent telephone number;

replacing said temporary telephone number in said table with said permanent telephone number; and sending said permanent telephone number to said cellular telephone switching center.

12. The method of claim 11 wherein said step of generating said memory identification number comprises generating an International Mobile Subscriber Identity number.

13. The method of claim 11 wherein said step of generating said temporary telephone number comprises generating a temporary Mobile Station Integrated Services Digital Network telephone number.

14. The method of claim 11 wherein said step of generating said permanent telephone number comprises generating a permanent Mobile Station Integrated Services Digital Network telephone number.

15. The method of claim 11 wherein said step of modifying said table further comprises determining a class of service for said cellular telephone and selecting a predetermined telephone number based upon said class of service, said step of sending said memory identification number further comprises sending said predetermined telephone number, and said step of receiving comprises receiving said call on said predetermined telephone number.

16. A method of providing service to the owner of a cellular telephone, comprising the steps of:

generating a memory identification number for storage in a memory for use with a cellular telephone;

receiving a table which associates said memory identification number with a Subscriber Identity Module (SIM) serial number placed on said memory;

receiving a table which associates said SIM serial number, a handset identification number, and a product package identification number for said cellular telephone;

generating a telephone number for said cellular telephone;

creating a table which associates said memory identification number, said SIM serial number, said handset identification number, and said product package identification number with said telephone number;

receiving a call from said cellular telephone via a cellular telephone switching center;

receiving said telephone number for said cellular telephone from said cellular telephone switching center;

using said telephone number and said table to identify a manufacturer type for said cellular telephone; and routing said call from said cellular telephone based upon said manufacturer type.

17. The method of claim 16 wherein said step of generating said memory identification number comprises generating an International Mobile Subscriber Identity number.

18. The method of claim 16 wherein said step of generating said telephone number comprises generating a Mobile Station Integrated Services Digital Network telephone number.

19. The method of claim 16 wherein said step of creating said table further comprises determining a class of service for said cellular telephone and selecting a predetermined telephone number based upon said class of service, and said step of receiving said call comprises receiving said call on said predetermined telephone number.

20. A method of providing service to the owner of a cellular telephone, comprising the steps of:

generating a memory identification number for storage in a memory for use with a cellular telephone;

generating a table which associates said memory identification number with a temporary Subscriber Identity Module (SIM) serial number placed on said memory;

receiving information which associates a permanent SIM serial number, a handset identification number, a product package identification number, and said memory identification number for said cellular telephone;

generating a telephone number for said cellular telephone;

updating said table to associate said memory identification number and said telephone number with said permanent SIM serial number, said handset identification number, and said product package identification number;

receiving a call from said cellular telephone via a cellular telephone switching center;

receiving said telephone number for said cellular telephone from said cellular telephone switching center;

using said telephone number and said table to identify a manufacturer type for said cellular telephone; and routing said call from said cellular telephone based upon said manufacturer type.

21. The method of claim 20 wherein said step of generating said memory identification number comprises generating an International Mobile Subscriber Identity number.

22. The method of claim 20 wherein said step of generating said telephone number comprises generating a Mobile Station Integrated Services Digital Network telephone number.

23. The method of claim 20 wherein said step of updating said table further comprises determining a class of service for said cellular telephone and selecting a predetermined telephone number based upon said class of service, and said step of receiving said call comprises receiving said call on said predetermined telephone number.

* * * * *